United States Patent
Yamamoto et al.

[15] 3,641,653
[45] Feb. 15, 1972

[54] APPARATUS FOR AUTOMATIC ASSEMBLY OF A ROTOR AND THE LIKE

[72] Inventors: Kiyokazu Yamamoto, Kyoto; Masaru Kishimoto, Kaizuka-shi; Susumu Ueno, Kadoma-shi; Hiroshi Fujimoto, Hirakata-shi; Kazutaka Hatamoto; Tadashi Kubota, both of Osaka, all of Japan

[73] Assignee: Matsushita Electric Industrial Co., Ltd., Osaka, Japan

[22] Filed: Aug. 15, 1969

[21] Appl. No.: 850,449

[30] Foreign Application Priority Data

| Dec. 7, 1968 | Japan | 43/89792 |
| Dec. 7, 1968 | Japan | 43/89793 |
| Dec. 7, 1968 | Japan | 43/89794 |
| Dec. 7, 1968 | Japan | 43/89795 |
| Dec. 7, 1968 | Japan | 43/89796 |
| Dec. 7, 1968 | Japan | 43/89797 |
| Dec. 7, 1968 | Japan | 43/89798 |
| Dec. 7, 1968 | Japan | 43/89799 |

[52] U.S. Cl. ......................................... 29/208 R
[51] Int. Cl. ........................................... B23p 19/04
[58] Field of Search .................. 29/208, 208 X, 211, 211 C

[56] References Cited

UNITED STATES PATENTS

| 2,743,512 | 5/1956 | Moyer | 29/211 X |
| 2,995,810 | 8/1961 | Wilson et al. | 29/208 |
| 3,065,530 | 11/1962 | Merchant et al. | 29/208 X |
| 3,111,748 | 11/1963 | Doll et al. | 29/208 |

Primary Examiner—Granville Y. Custer, Jr.
Attorney—Stevens, Davis, Miller & Mosher

[57] ABSTRACT

Apparatus for automatically assembling or welding parts in the form of discs such as forming a rotor of a television tuner with a shaft. The apparatus comprises a plurality of parts mounting jigs located at an equal distance from each other on a turntable driven intermittently, a shaft supply device located adjacent to the outside of the periphery of the turntable and adapted to supply shafts to the respective jigs so as to be inserted into the parts held in each of the jigs, a shaft position regulating device for causing relative angular movement between the shaft and the mating parts so that the shaft is located at a predetermined angular position with respect to the parts, a shaft position detecting device adapted to detect the axial position as well as the angular position of the shaft assembled to the parts, a joining device for joining the shaft with the mating parts, and a detaching device for removing the parts with the shaft assembled therewith from each of the parts mounting jigs, so that a series of operations for the assembly of the parts are automatically carried out.

8 Claims, 21 Drawing Figures

PATENTED FEB 15 1972  3,641,653

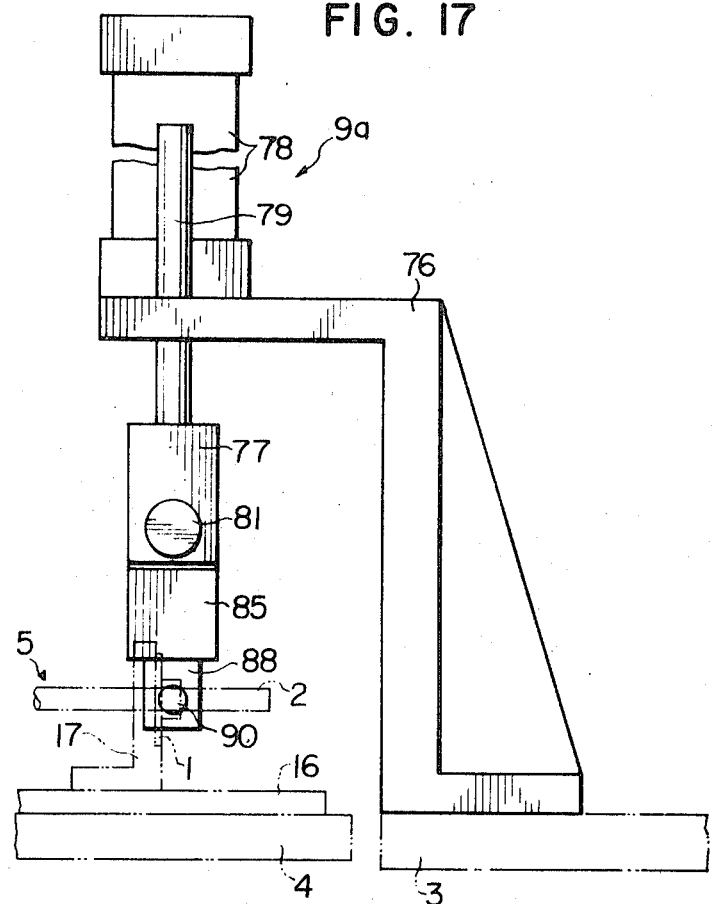
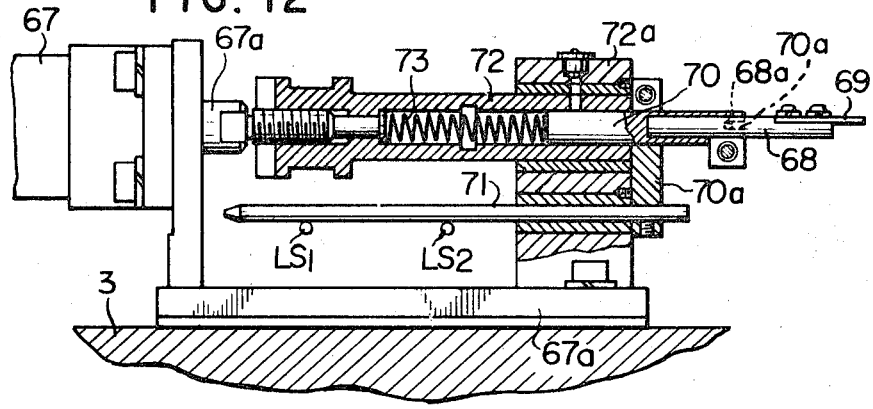

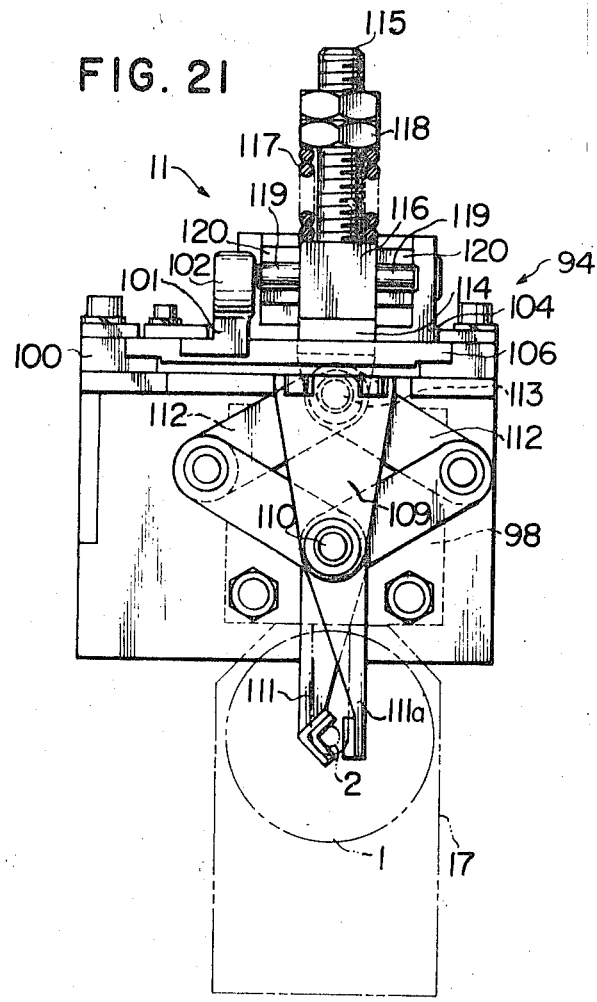

APPARATUS FOR AUTOMATIC ASSEMBLY OF A ROTOR AND THE LIKE

The present invention relates to an apparatus for automatically assembling parts in the form of discs such as forming a rotor of a television tuner with a shaft with the axial position and the angular position of the shaft being set at predetermined relative positions with respect to the mating parts, respectively, so that the flow process for production of the assemblies is made extremely efficient, while the stability in the quality of the thus completed assemblies is assured.

Heretofore, an assembly such as a rotor of a television tuner has been produced by positioning a pair of discs at a predetermined distance spaced from each other, manually inserting a shaft into the hole of each of the discs, rotating each of the discs so that a reference hole formed in each of the discs assumes a predetermined angular position with respect to a cutout portion formed in the shaft while each of the discs is moved axially so that a reference grove formed in the shaft is spaced predetermined axial distances from the respective discs, and thereafter, joining the discs with the shaft by means such as a spot-welding machine.

Such a procedure is, however, very troublesome in operation and requires a long working time and sufficient skill and experience of the operator are necessary for carrying out the assembly of the rotors, thereby resulting in the reduction in the number of the assemblies produced per unit time so that the efficiency of the operation is very low.

The present invention aims at avoiding the above described disadvantages of the prior art.

An object of the present invention is to provide a novel and useful apparatus for automatically assembling parts such as forming a rotor of a television tuner.

Another object of the present invention is to provide an apparatus of the type described above which makes it possible to produce the assemblies very efficiently in the flow process of the production thereof while the quality of the thus-made assemblies is kept superior and stable.

A further object is to provide an apparatus of the type described above in which a plurality of parts to be assembled together are successively supplied to respective jigs mounted on a turntable so that the parts in each of the jigs are assembled, the assembled parts being joined together by means such as welding and caulking, thereby permitting the assemblies to be completed successively.

Still further object of the present invention is to provide an apparatus of the type described above in which the parts are successively supplied to each of the jigs on the turntable from a supply station located adjacent to the outside of the turntable each time the same has been intermittently rotated a unit angle corresponding to the location of the jigs and means is provided for detecting the quality of the assemblies, the detecting means being so actuated that, in case an inappropriate assembly is detected, the steps to follow the detecting step are automatically stopped so that production of improper assemblies is prevented.

Another object of the present invention is to provide a novel and useful joining device for use with the apparatus for assembling the parts as described above, in which the joining forces to be applied to the parts to be joined together are applied symmetrically and evenly from the opposite directions so that the parts held in the jig are prevented from being subjected to any undesired resultant force which might cause relative movement of the parts thereby resulting in inaccurate assembling of the parts.

Another object of the present invention is to provide a novel and useful jig for use in an apparatus for assembling parts such as forming a rotor of a television tuner in which the parts such as discs are held in positions so as to be assembled with a shaft with the axial position as well as the angular position of each of the discs with respect to the shaft being automatically set at predetermined positions, respectively.

Still another object of the present invention is to provide a novel and useful device for properly inserting a shaft into parts such as discs forming a rotor of a television tuner, the device being adapted to be conveniently used with an apparatus for assembling the rotor with the axial position and the angular position of each of the discs with respect to the shaft being set at predetermined positions, respectively, which device is simple in construction and accurate in operation for smoothly feeding one shaft at one time and properly inserting in the parts to be assembled therewith.

A further object of the present invention is to provide a novel and useful device for regulating the angular position of a shaft with respect to parts to be assembled therewith such as discs forming a rotor of a television tuner, in which the shaft previously inserted at any relative angular position into the parts located in a jig at a predetermined angular position is positively rotated to a predetermined angular position so as to set the shaft at a proper angular position.

Still further object is to provide a novel and useful device for accurately and quickly detecting the angular position of a shaft with respect to parts such as discs forming a rotor of a television tuner which are previously located in a jig at a predetermined angular positions, in which the shaft is to be set in the discs at a predetermined axial position as well as at a predetermined angular position with respect to the discs, the device being adapted to carry out the investigation in a simple manner whether or not the shaft is properly inserted in the parts after the angular position of the shaft has been corrected in the preceding step.

Another object is to provide a novel and useful detaching device for use with an apparatus for automatically assembling successively assemblies such as rotors of a television tuner comprising discs into which a shaft is inserted and set at a predetermined axial position as well as at a predetermined angular position with respect to the discs, the device being compact in size and simple in construction and adapted to smoothly and positively removing each of the assemblies from the respective jigs in the apparatus even though each of the assemblies is engaged with the respective jigs in the lateral direction thereof so that the assembly can not be lifted directly from the jig.

These features and advantages of the present invention will become further apparent from the following detailed description when considered in conjunction with the accompanying drawings, in which:

FIG. 11 is a fragmentary end view showing an example of the configuration of the outer end of the shaft position regulating head pin used in the device of FIG. 9;

FIG. 12 is a fragmentary view showing an embodiment of the shaft position detecting device used in the apparatus of the present invention;

FIG. 17 is a side view of the device of FIG. 16;

FIG. 21 is an end view as seen from the left in FIG. 20.

Figure 2:
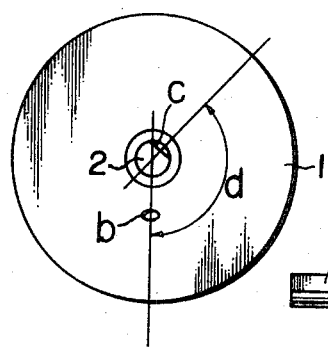
FIGS. 1 and 2 are views showing the manner how a part such as a shaft is assembled with the mating parts such as discs in the predetermined relative positions to each other.
Figure 1:
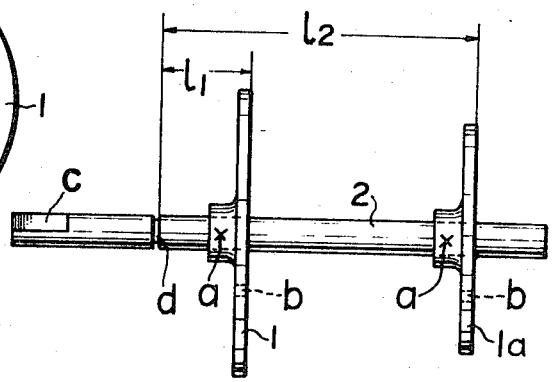

Referring to FIGS. 1 and 2, an example of the assembly which is assembled by the apparatus of the present invention is shown.

The assembly comprises a pair of discs 1, 1a coaxially spaced a predetermined distance from each other, a shaft 2 inserted into a center hole of each of the discs 1, 1a and secured thereto at point $a$ in the hub of each of the discs 1, 1a by means such as spot welding. Each of the discs 1, 1a is provided with a reference hole $b$ and the shaft 2 is provided with a cutout portion $c$ at one end thereof so that the angular position of each of the discs 1, 1a relative to the shaft 2 is properly set by setting the angle $\alpha$ formed between the line joining the hole $b$ and the center of each of the discs 1, 1a and the line normal to the cutout portion $c$ and passing through the center of each of the discs 1, 1a to a predetermined angle. The shaft 2 is also provided with an annular groove $d$ adjacent to the one end thereof so that the distance between the two discs 1, 1a as well as the relative axial position of each of the discs 1, 1a with respect to the shaft 2 is properly set by setting the distance $l_1$ between the annular groove $d$ of the shaft 2 and the disc 1 and the distance $l_2$ between the annular groove $d$ and the disc 1 to predetermined lengths, respectively, as shown.

Figure 3:
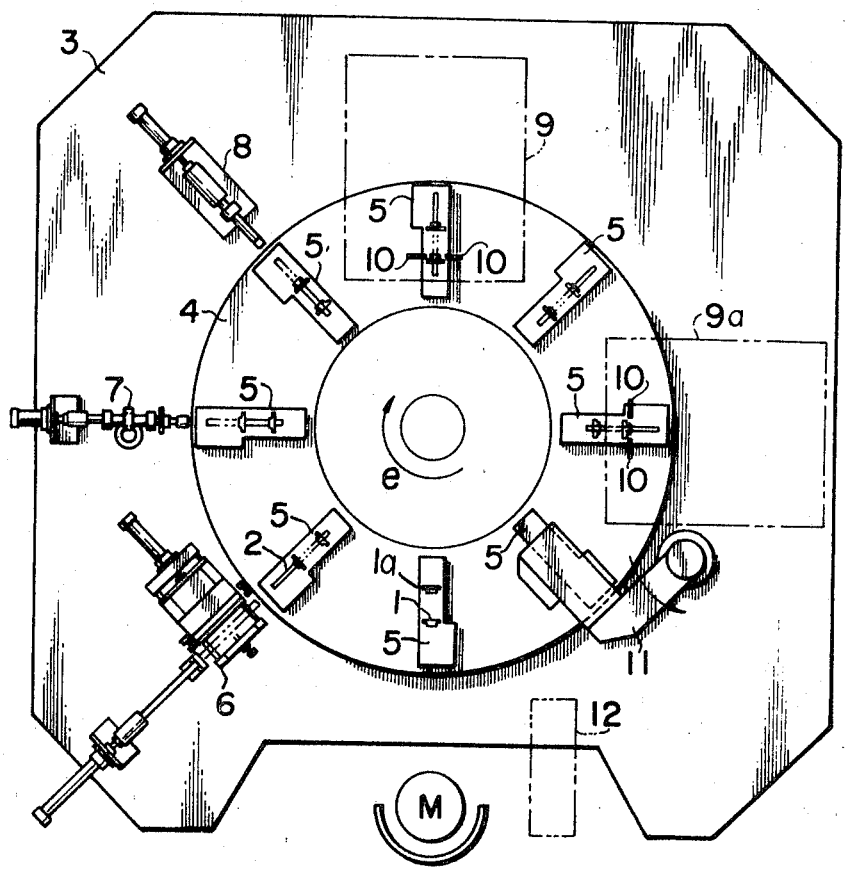
FIG. 3 is a plan view showing the general construction of an embodiment of the apparatus in accordance with the present invention.

The general construction of an embodiment of the apparatus of the present invention for assembling the assembly as shown in FIGS. 1 and 2 is shown in FIG. 3.

In FIG. 3, main body 3 of the apparatus carries therein a turntable 4 rotatably supported by the main body 3 and adapted to be intermittently driven in the direction indicated by arrow $e$ a predetermined angle by means of a driving mechanism not shown.

The turntable 4 carries thereon a plurality of parts mounting jigs adjacent to the outer periphery of the turntable 4 equally spaced from each other. The spacing of the adjacent two jigs 5 is made to correspond to the angle of the intermittent rotation of the turntable 4.

A pair of discs 1, 1a are manually supplied to the respective jigs 5 by an operator M in properly spaced relation to each other with the angular position of each of the discs 1, 1a being set properly by the jig each time the turntable is rotated and one of the jigs 5 is positioned in front of the operator M.

A signal is generated each time the operator M has supplied the discs 1, 1a to the respective jigs 5 so that the turntable 4 is rotated by the predetermined angle for the next operation of the operator M.

A shaft supply device 6, a shaft position regulating device 7, a shaft position detecting device 8 and a joining device 9 such as a welding device are located in the main body 3 around the outer periphery of the turntable 4 adjacent thereto in that order in the direction of the intermittent rotation of the turntable 4. The spacing between the adjacent two devices described above as well as the spacing between the position at which the operator M is operating and the shaft supply device 6 is made to correspond to the spacing between the adjacent two jigs 5 in the turntable 4 so that each time the turntable 4 is rotated and stopped, the respective jigs 5 are located in alignment with the respective devices 6, 7, 8 and 9.

Another joining device 9a is located adjacent to the outer periphery of the turntable 4 spaced from the joining device 9 by an angle twice as great the predetermined angle by which the turntable 4 is intermittently rotated.

The joining device 9 which is shown as being a welding device is determined to secure the shaft 2 to the disc 1a, for example, by using welding tips 10 while the other joining device 9a is determined to secure the shaft to the other disc 1 as described in detail hereinafter.

A detaching device 11 for detaching the completed assembly from the respective jigs 5 is located adjacent to the outer periphery of the turntable 4 spaced from the joining device 9a by the angle corresponding to the angle of intermittent rotation of the turntable 4. A chute 12 is provided adjacent to the detaching device 11 for discharging the assembly removed by the detaching device 11 from the respective jigs 5 out of the apparatus of the present invention.

As described in detail hereinbelow, the apparatus of the invention is so operated that each time the intermittent rotation of the turntable 4 is effected by the signal generated by the supply of the discs 1, 1a into the respective jigs 5 by the operator M, the shaft supply device 6 supplies a shaft 2 into the discs 1, 1a which have been loaded in the jigs 5 facing to the shaft supply device 6, the shaft position regulating device 7 actuates the shaft 2 having been inserted in the discs 1, 1a in the jig 5 which is now in alignment with the shaft position regulating device 7 so as to be properly positioned with respect to the discs 1, 1a as indicated in FIGS. 1 and 2, the shaft position detecting device 8 is engaged with the jig which is in alignment with the detecting device 8 and detects whether or not a shaft 2 has been actually inserted and, if so, whether or not the shaft 2 is properly positioned in the discs 1, 1a in the angular and axial positions with respect thereto so as to generate signals to actuate the joining devices 9, 9a only when the shaft 2 is properly set and the jig carrying the thus detected shaft 2 is brought to the respective joining devices 9, 9a, and each of the joining devices 9, 9a is actuated by the signal supplied from the detecting device 8 so as to secure the shaft 2 to the respective discs 1, 1a, while the detaching device 11 is actuated so that the finished assembly of the discs 1, 1a with the shaft 2 is removed from the jig 5 facing to the detaching device 11 and taken out from the apparatus through the chute 12. All these steps are carried out in synchronism with each other each time the turntable 4 has been rotated by the signal generated by the loading of the discs 1, 1a in the jig 5 facing to the operator M.

In the drawing, the number of discs 1, 1a is shown as being two, but it is apparent any number of the discs desired may be assembled by the apparatus of the present invention.

Also, the number of the jigs 5 is shown as being eight, but any desired number of jigs may be employed in accordance with the present invention.

Now, detailed description of each of the parts-mounting jigs 5, the shaft supply device 6, the shaft position regulating device 7, the shaft position detecting device 8, the joining devices 9, 9a and the detaching device 11 will be given hereinbelow in connection with FIGS. 4-20.

Parts-Mounting Jig

Figure 4:
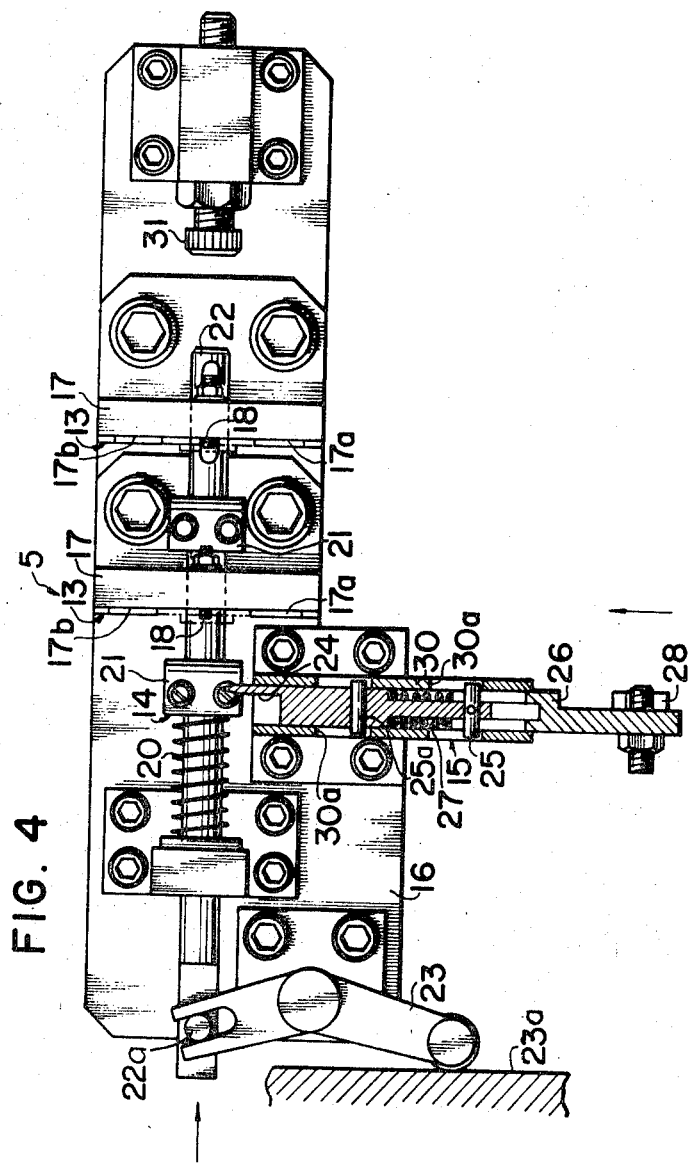
FIG. 4 is a fragmentary view showing an embodiment of the parts-mounting jig used in the apparatus of the present invention.
Figure 5:
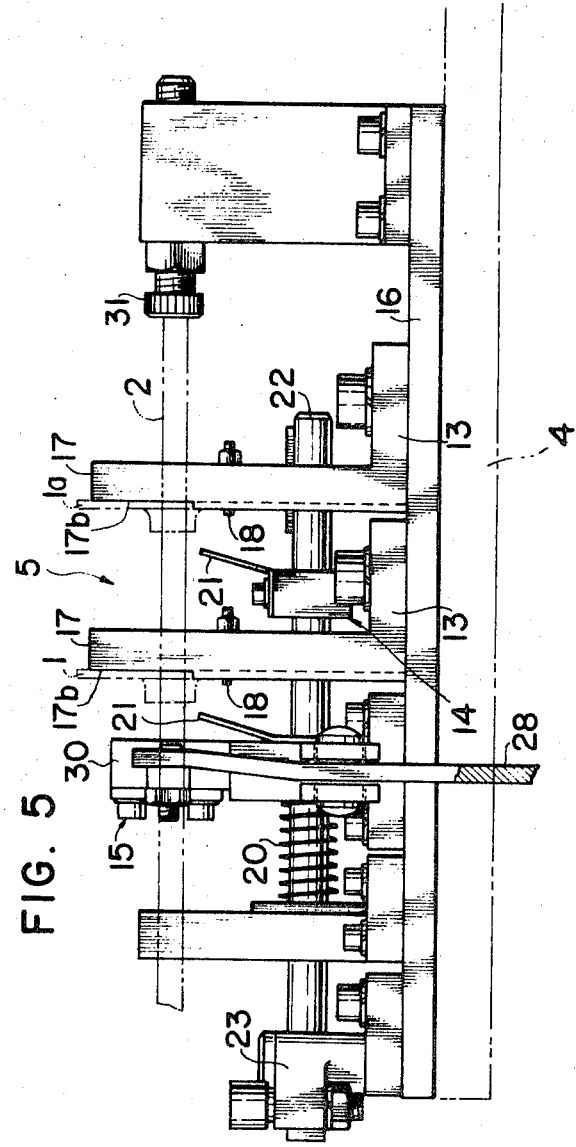
FIG. 5 is an elevational view of FIG. 4.
Figure 6:
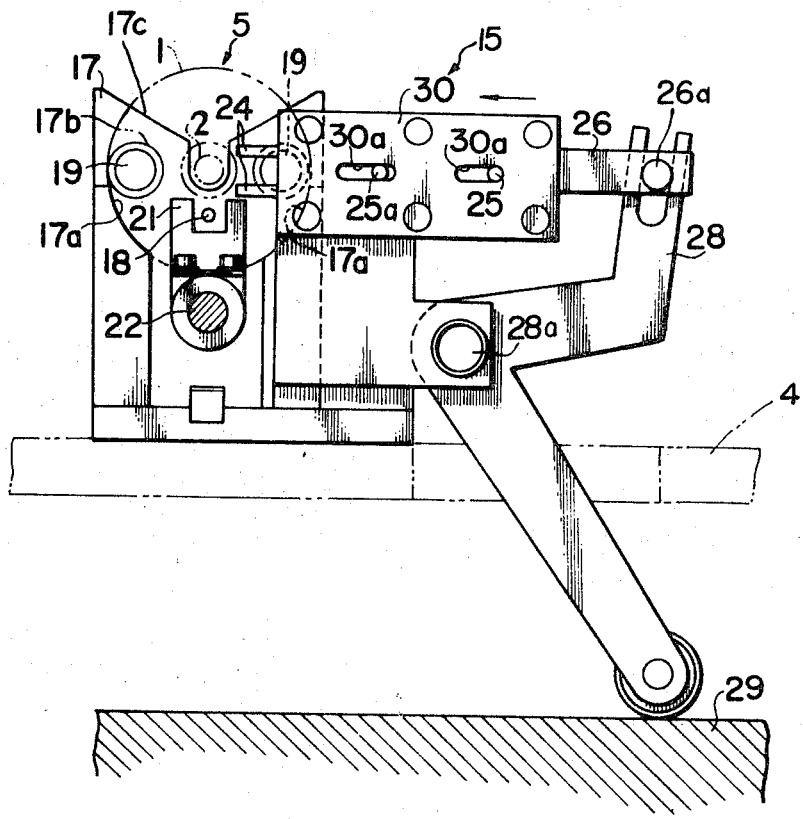
FIG. 6 is an end view of FIG. 4.

In FIGS. 4-6, the parts-mounting jig 5 comprises support plates 13, holding device 14 and shaft stopper device 15. The support plates 13 are secured to mounting plate 16 which in turn is mounted in position on the turntable 4, while holding device 14 is shiftably supported in the mounting plate 16 as hereinafter described so as to resiliently hold the discs 1, 1a mounted in the support plates 13.

Each of the support plates 13 comprises a bracket 17 having a disc-receiving recess 17a for snugly receiving the disc 1 or 1a and a V-shaped cutout portion 17c (FIG. 6) in the center of the upper end thereof for passing therethrough the shaft 2, a reference pin 18 secured to the bracket 17 for engaging with the reference hole $b$ of the disc 1 or 1a so as to properly set the angular position of the disc 1 or 1a received in the recess 17a and a pair of magnets 19 embedded in the bracket at positions 17b. When the operator M supplies the discs 1, 1a in the respective recesses 17a with the reference pins 18 engaged with the respective reference hole b in the discs 1, 1a, respectively, each of the discs 1, 1a is held in proper position by means of the magnets 19.

The holding device 14 serves to hold the respective discs 1, 1a so as to prevent them from being disengaged from the surfaces 17b of the bracket 17 when the joining devices 9, 9a are actuated. The holding device 14 comprises a spring 20, L-shaped biasing plates 21 and a supporting rod 22 on which the biasing plates 21 are mounted, and lever means 23 swingably mounted on the mounting plate 16 as shown. The spring 20 normally urges the rod 22 toward the right in FIG. 4 so that the biasing plates 21 are urged against the brackets 17 thereby resiliently holding the discs 1, 1a therebetween. The rod 22 is provided with a small pin 22a at its one end adjacent to the lever 23 and the small pin 22a engages with the bifurcated end of the lever 23 so that, when the lever 23 is actuated by a cam 23a as shown in FIG. 4 after the joining device 9a is actuated, the rod 22 is moved toward the left in FIG. 4 against the action of the spring 20 so that the biasing plates 21 are disengaged from the discs 1, 1a.

The stopper device 15 comprises shaft position regulating pawl member 24 having pins 25, 25a secured thereto. A shiftable rod 26 is relatively movably engaged with the pawl member 24 through springs 27. A swingable lever 28 is provided for cooperating with cam 29. The lever 28 is pivoted at 28a as shown, and a pin 26a provided at the outer end of shiftable rod 26 engages with the bifurcated end of the lever 28 so that, when the lever 28 is swung by the engagement thereof with the raised portion of the cam 29, the shiftable rod 26 is moved toward the left in FIG. 6 thereby permitting the pawl member 24 to be driven into engagement with the annular groove d of the shaft 2 when the shaft 2 is inserted into the discs 1, 1a located in the jig 5. This permits the shaft 2 to be held in proper axial position with respect to the discs 1, 1a and prevents it from being moved by the centrifugal force caused by the intermittent rotation of the turntable 4.

As seen in FIG. 6, the pawl member 24 is axially slidably supported between a pair of brackets 30 with the pins 25, 25a of the pawl member 24 slidably engaged with elongated holes 30a formed in the brackets 30. The elongated holes 30a also serve to limit the axial movement of the pawl member 24.

The shaft stopper device 15 is actuated so as to hold the shaft 2 by the cam 29 immediately after the shaft 2 is inserted into the discs 1, 1a by means of the shaft supply device 6 and, after the joining device 9a is actuated, the shaft stopper device 15 is loosened.

A stopper 31 is provided in the mounting plate 16 for limiting the axial movement of the shaft 2 when the same is inserted in the discs 1, 1a.

As described above, when the shaft 2 is inserted in the discs 1, 1a by the shaft supply device 6 and the pawl member 24 is engaged with the annular groove d of the shaft 2, the axial position of the shaft 2 with respect to the discs 1, 1a is properly maintained.

Shaft Supply Device

Figure 7:
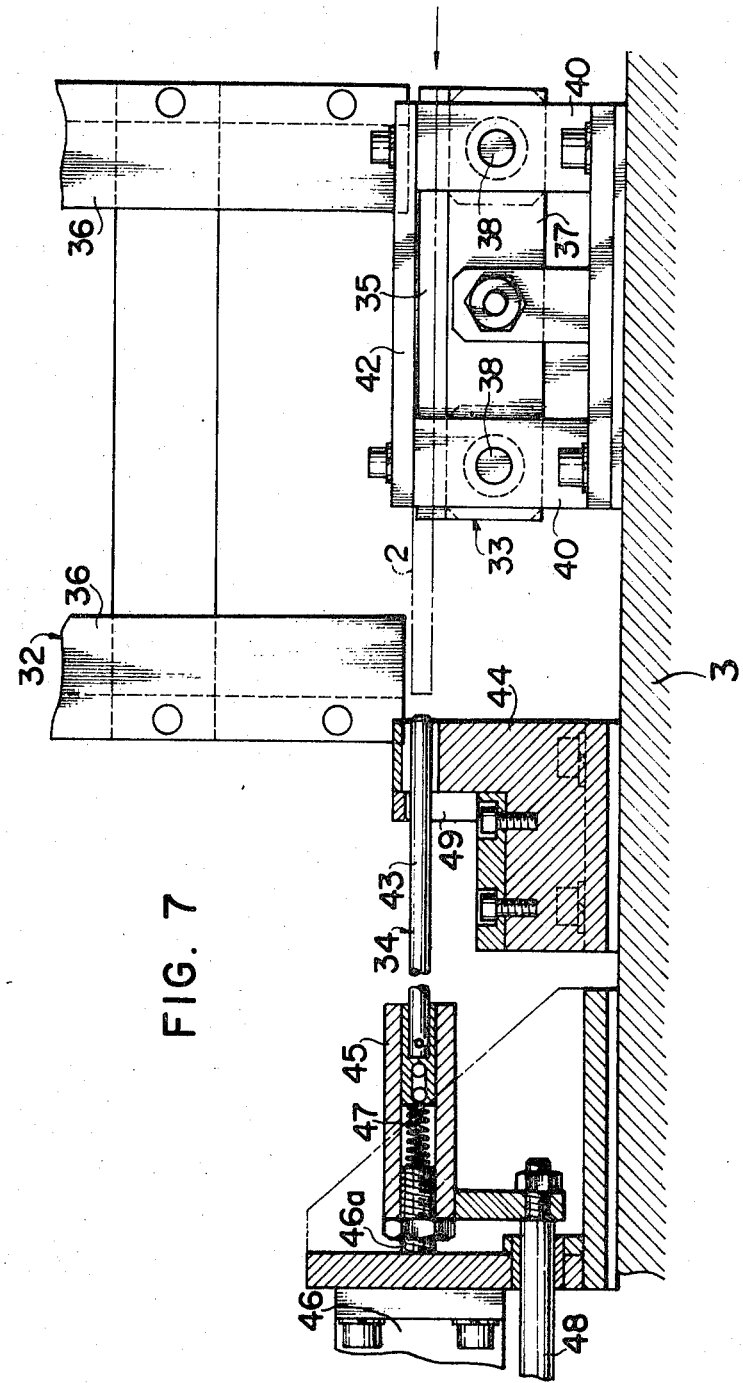
FIG. 7 is a fragmentary view partly in cross section showing an embodiment of the shaft supply station used in the apparatus of the present invention.
Figure 8:
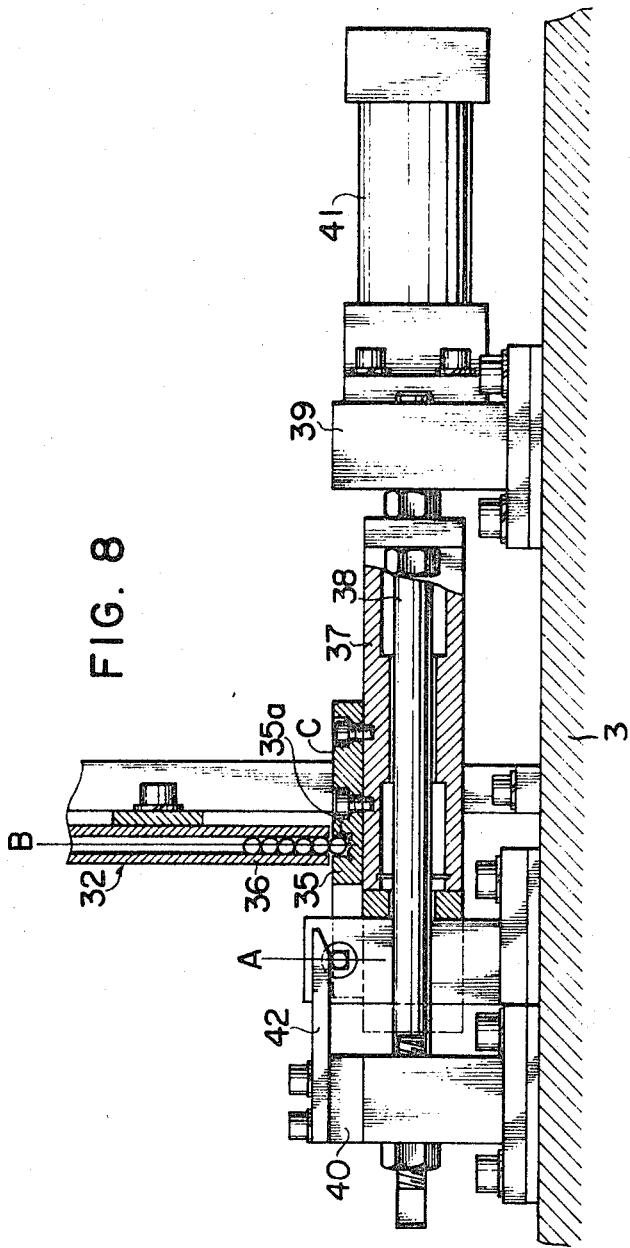
FIG. 8 is an end view partly in cross section as seen from the right in FIG. 7.

The shaft supply device is shown in FIGS. 7 and 8. It comprises chute means 32, lateral feed means 33 and shaft-inserting punch means 34. Each of the shafts 2 supplied from the chute means 32 is moved by the lateral feed means 33 from the feeding center B in the chute means 32 to inserting center A in the shaft-inserting punch means 34, so that the shaft 2 thus laterally fed is inserted by the shaft-inserting punch means 34 into the discs 1, 1a mounted in the jig 5 aligned with the shaft-inserting punch means 34. The shaft 2 arranged in the chute means 32 next to the shaft 2 which has been laterally fed by the lateral feed means 33 is held on the surface c of the feeding head 35 of the lateral feed means 33 between the two chute plates 36 of the chute means 32 and, after the head 35 is moved back, the shaft 2 held in the surface c falls into groove 35a of the head 35 so as to be fed laterally by the next operation of the feed means 33 thus permitting one shaft 2 to be driven laterally each time the feed means 33 is actuated.

The feeding head 35 is mounted on shiftable block 37 which in turn is slidably guided by guide rods 38 supported by means of brackets 39, 40. The block 37 is reciprocally driven by means of a cylinder 41 operably connected to the block 37 so that the groove 35a of the head 35 is repeatedly moved between the center positions A and B.

A support plate 42 secured to the top of the bracket 40 serves to prevent the shaft 2 in the groove 35a from being moved upwardly therefrom when the same is fed to the center position A.

The shaft-inserting punch means 34 comprises a shaft-inserting punch 43, a guide block 44 therefor, a punch holder 45 and a shaft-inserting cylinder 46 having a piston rod 46a connected to the punch holder 45 so as to drive the punch 43. A spring 47 is interposed between the punch 43 and the punch holder 45 so as to provide a cushioning effect when the shaft 2 is driven into the discs 1, 1a by the punch 43. One or more guide rods 48 secured to the punch holder 45 and slidably engaging with the bracket on which the cylinder 46 is mounted serve to guide the axial movement of the piston rod 46a.

Interchangeable stopper 49 secured to the bracket 44 serves to limit the stroke of the piston rod 46a as desired.

Shaft Position Regulating Device

Figure 9:
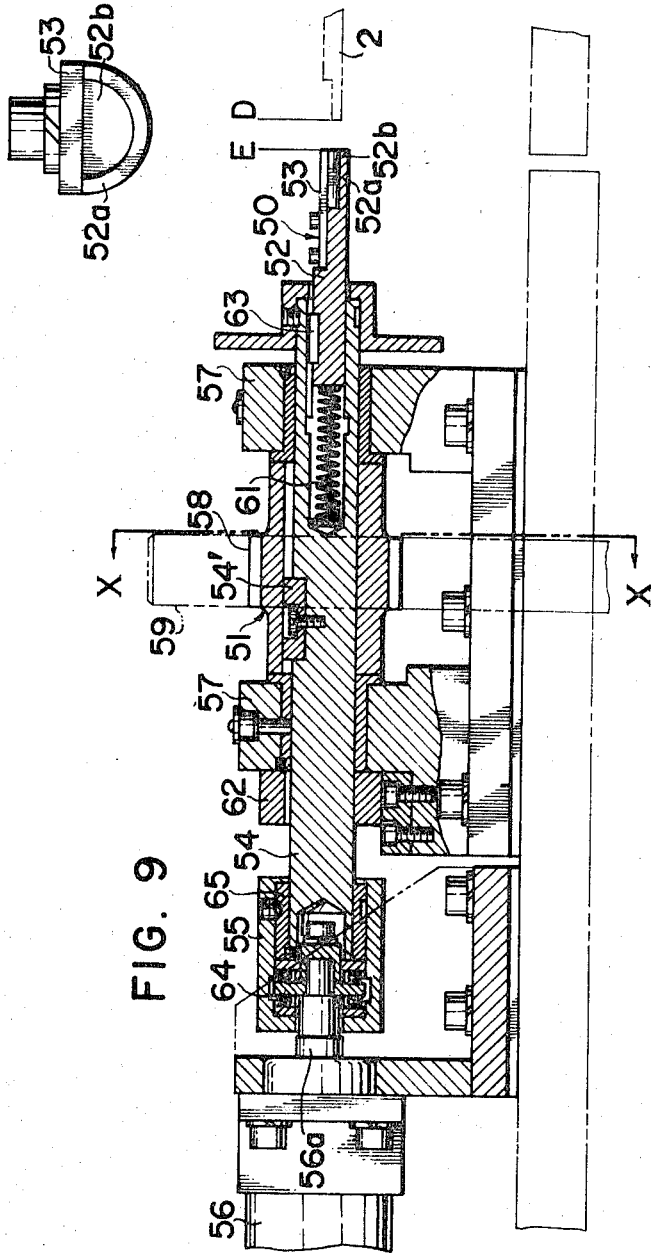
FIG. 9 is a fragmentary view partly in cross section showing an embodiment of the shaft position regulating device used in the apparatus of the present invention.
Figure 10:
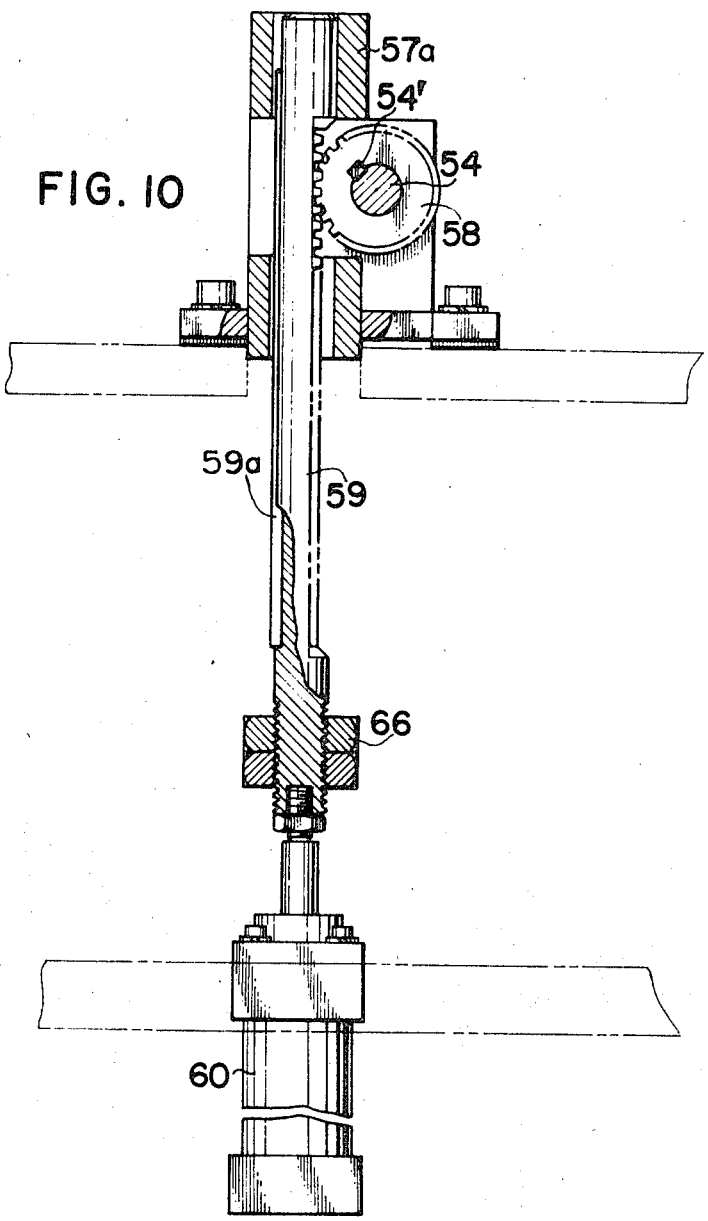
FIG. 10 is a cross-sectional view taken along line X—X in FIG. 9.
Figure 13:
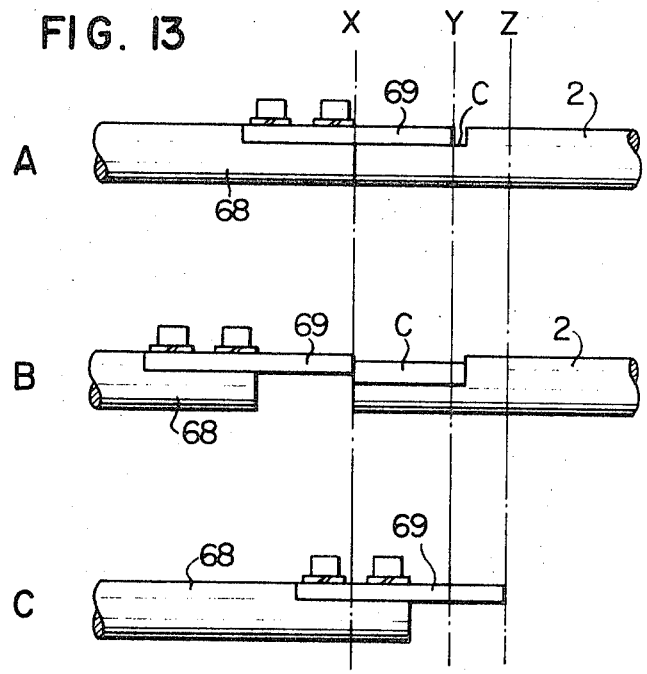
FIG. 13 shows the manners how the shaft position detecting head pin of the device shown in FIG. 12 is stopped at various positions depending upon the conditions of the shaft to be assembled with the discs mounted in each of the jigs on the turntable.

The shaft position regulating device is shown in FIGS. 9-11.

The shaft position regulating device comprises a shaft position regulating head 50 and a shaft-rotating device 51. By the shaft position regulating device, the shaft 2 inserted in the discs 1, 1a is rotated so that the angular position of the cutout portion c of the shaft 2 is properly set with respect to the reference hole b of the respective discs 1, 1a as previously described in connection with FIGS. 1 and 2.

The shaft position regulating head 50 comprises a shaft position regulating head pin 52, a regulating plate 53 mounted on the cutout portion in the side surface at the outer end of the head pin 52, a holding rod 54 resiliently connected to the head pin 52 so as to permit the axial movement thereof with respect to the holding rod 54 in a predetermined amount, a connecting block 55 rotatably connected to the rod 54, a cylinder 56 operatively connected to the connecting block 55 so as to reciprocally drive the holding rod 54, and a pair of holding brackets 57 for slidably guiding the holding rod 54. The holding rod 54 is rotatably connected to the connecting block 55 but is prevented from being moved axially relative thereto so as to drive the holding rod 54 by means of the cylinder 56 through the connecting block 55.

The shaft-rotating device 51 comprises a pinion 58 axially slidable relative to the holding rod 54 between the brackets 57, the pinion 58 being prevented from rotating relative to the rod 54 by the engagement of a key 54' secured to the rod 54 with an axial keyway formed in the hole of the pinion 58 as shown, a rack 59 engaging with the pinion 58 and a cylinder 60 operably connected to the rack 59 so as to rotate the pinion 58 through the rack 59. As shown in FIG. 10, the rack 59 is provided with a key 59a which is slidably engaged with a keyway formed in the hole of a bracket 57a slidably receiving the rack 59 so that the rack 59 is prevented from being rotated about its own axis.

As shown in FIGS. 9 and 11, a recessed portion 52b is formed at the outer end of the shaft position regulating head pin 52 surrounded by semicircular cylindrical wall 52a of the head pin 52 and the regulating plate 53 so that the end of the shaft 2 at which the cutout portion c is formed is snugly received by the recessed portion 52b without permitting the relative rotation therebetween.

The operation of the shaft position regulating device 7 is as follows. By the operation of the cylinder 56, the shaft position regulating head pin 52 is advanced through the piston rod 56a.

If the end of the shaft 2 is not received in the recessed portion 52b of the head pin 52, the end surface E of the head pin 52 abuts against the end surface D of the shaft 2 and might cause the buckling of the shaft 2. A spring 61 interposed between the head pin 52 and the holding rod 54 provides the cushioning therebetween so that such a buckling is prevented.

After the end surface E of the head pin 52 abuts against the end surface D of the shaft 2 and the advance of the holding rod 54 is stopped by the abutting of the connecting block 55 against a stopper 62 mounted on the bracket 57, the cylinder 60 is actuated so as to rotate the holding rod 54 through the rack 59 and the pinion 58. In order to rotate the head pin 52 together with the rod 54 while allowing the relative axial movement therebetween, a key 63 is provided on the pin 52 which slidably engages with a keyway formed in the hole of the rod 54 slidably receiving the pin 52. As the pin 52 is rotated, the recessed portion 52b of the pin 52 will snugly receive the end of the shaft 2 so as to rotate the shaft 2 together with the pin 52. By appropriately determining the stroke of the cylinder 60, the shaft 2 is rotated to a predetermined angular position with respect to the discs 1, 1a, since the discs 1, 1a are prevented from rotating by the engagement of the reference holes b in the discs 1, 1a with the reference pins 18 of the jig 5.

In order to easily rotate the rod 54 without undue resistance caused by the thrust acting on the connecting block 55, double thrust bearings 64 are provided in the connecting block 55 as shown in FIG. 9. Bush 65 is interposed between the connecting block 55 and the holding rod 54.

The stopper 62 is interchangeable so that the stroke of the holding rod 54 is made adjustable.

In order to adjust the stroke of the rack 59, an adjustable stopper 66 is provided on the rack 59, which abuts against a stationary portion in the main body 3 (not shown) when the rack 59 is driven by the cylinder 60 so that the amount of the rotation of the pinion and hence the holding rod 54 is limited to the desired value.

Shaft Position Detecting Device

The shaft position detecting device is shown in FIG. 12. As shown, a cylinder 67 is mounted on a bracket secured to the mounting plate 67a which in turn is secured to the main body 3. A detecting head pin 68 carrying a detecting plate 69 on the outer end thereof is interchangeably secured to a holder 70 with the angular position thereof relative to the holder 70 being determined by a pin 68a secured to the pin 68 engaging with a slot 70a formed at the end of the holder 70. One or more guide rods 71 are secured to a bracket 70a which in turn is secured to the holder 70. A main rod 72 connected to the piston rod 67a of the cylinder 67 is slidably guided in a hole of a bracket 72a secured to the mounting plate 67a. The holder 70 is resiliently and axially movably received in a hole of the main rod 72 by the interposition of a spring 73. Thus the head pin 68 is axially moved by the actuation of the cylinder 67 with the cushioning effect provided between the head pin 68 and the main rod 72 by means of the spring 73.

The angular position of the detecting plate 69 is so determined that, when the cutout portion c of the shaft 2 is located properly, the detecting plate 69, when advanced by the actuation of the cylinder 67, engages with the cutout portion c as shown in FIG. 13A so that the tip of the detecting plate 69 is stopped at position Y. On the other hand, if the angular position of the cutout portion c of the shaft 2 is improper, the tip of the detecting plate 69 abuts against the tip of the shaft 2 so that the tip of the detecting plate 69 is stopped at position X as shown in FIG. 13B, while, if no shaft 2 is loaded in the jig 5, the head pin 68 is allowed to freely move the maximum stroke so as to be stopped at position Z in FIG. 13C. Thus, the existence and the angular location of the shaft 2 is detected by detecting the position of the head pin 68 when it has been advanced by the cylinder 67.

The head pin 67 and the detecting plate 69 are interchangeable so that any shape and angular position of the shaft 2 can be detected by selecting the suitable pin and plate.

Figure 14:
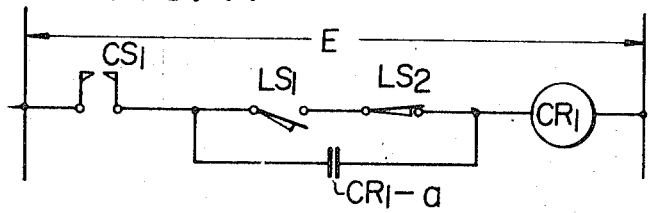
FIG. 14 shows an electric circuit used in the device of FIG. 12.

In order to detect the position of the head pin 68 so as to detect the position of the shaft 2, limit switches LS1 and LS2 are provided adjacent to one of the guide rods 71 which are operated when they are disengaged from the guide rod 71 and which are electrically connected in an electric circuit shown in FIG. 14. The limit switch LS1 is a normally opened switch while the limit switch LS2 is a normally closed switch, and the location of each of the limit switches LS1 and LS2 with respect to the guide rod 71 is so determined that, when the head pin 68 is advanced together with the guide rods 71 and stopped at position Y in FIG. 13A, only the limit switch LS1 is disengaged from the guide rod 71 so as to be closed so that the electric circuit is closed, whereas, when the head pin 68 is advanced to the position Z in FIG. 13B, both the switches LS1 and LS2 are disengaged from the guide rod 71 so that the electric circuit is opened by the opening of the normally closed switch LS2, while the electric circuit remains in opened state when the head pin 68 is stopped at the position X in FIG. 13C. Thus, a signal is generated in the electric circuit only when the head pin 68 is stopped at the position Y, i.e., when the shaft 2 is properly positioned in the jig 5.

Figure 15:
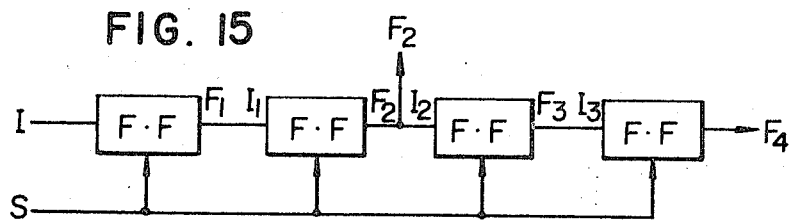
FIG. 15 is a block diagram showing the shift resister used in the device of FIG. 12.

The electric circuit comprises a timing switch CS1 and the limit switches LS1, LS2 and a relay CR1 connected in series. A capacitor CR1-a is connected in parallel to the combination of switches LS1, LS2 as shown. Electric voltage E is applied to the terminal of the timing switch CS1 and the terminal of the relay CR1 as shown. The signal I generated by the relay CR1 when the head pin 68 detects the proper positioning of the shaft 2 is supplied to a shift register comprising a plurality of flip-flop circuits F,F as shown in FIG. 15. At the same time, a pulse signal S is supplied to the shift register each time the turntable 4 has been rotated, i.e., each time the shaft position detecting device 8 is actuated, so that output signals $F_2$, $F_4$ are supplied to the respective joining devices 9, 9a from the second and fourth flip-flop circuits each time the jig 5 carrying thereon the correctly positioned shaft 2 reaches the respective joining devices 9, 9a thereby permitting the joining devices to be operated. However, when the shaft position detecting device 8 detects the improper positioning of the shaft 2 or nonexistence of the shaft 2 in the jig 5, no signal is supplied to the shift register thereby preventing the joining devices 9, 9a from being operated. In other words, the joining device 9 can be operated only by the output signal $F_2$ and the joining device 9a can be operated only by the output signal $F_4$. Thus, it will be easily understood that any shaft and disc which have not been served for assembling since the device 8 detected the improper positioning of the shaft 2, can be reused again. It will also be understood that by the use of another type of shift register the detaching device 11 can be arranged to become inoperative when the device 8 will detect the improper positioning of the shaft 2.

Joining Device

The joining device 9 is similar in construction to the joining device 9a except that the former is adapted to secure the disc 1a to the shaft 2 while the latter is adapted to secure the disc 1 to the shaft 2.

Figure 16:
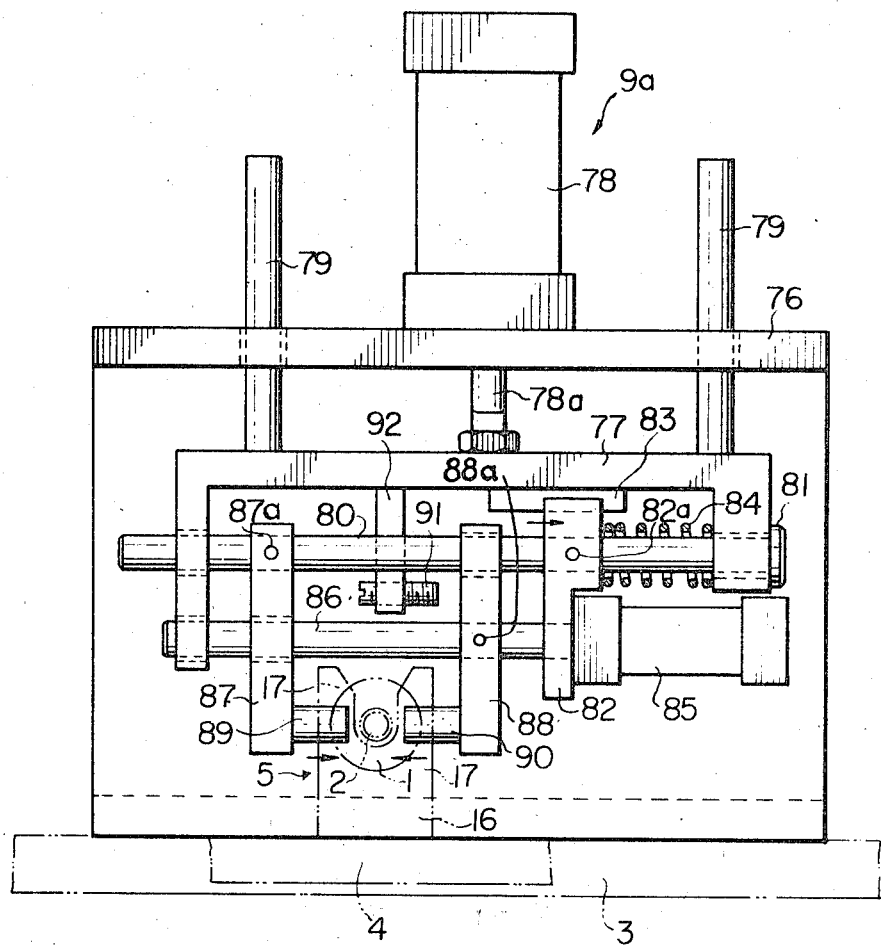
FIG. 16 is an elevational view showing an embodiment of the joining device used in the apparatus of the present invention.

The construction of one embodiment of the joining device of the present invention is shown in FIGS. 16 and 17.

In FIGS. 16 and 17, the jig 5 carrying thereon the discs 1, 1a and the shaft 2 assembled therewith and mounted on the turntable 4 is shown in alignment with the joining device 9a mounted on the main body 3. The joining device 9a comprises a bracket 76 which overhangs the jig 5. A vertically movable frame 77 is located under the overhanging portion of the bracket 76 and is operably connected to a cylinder 78 secured to the overhanging portion of the bracket 76 through a piston rod 78a slidably passing through the overhanging portion of the bracket 76 as shown in FIG. 16. A pair of guide rods 79 are secured to the frame 77 and slidably fit with openings in the bracket 76 for guiding the vertical movement of the frame 77 with respect to the bracket 76. A horizontally axially movable shaft 80 is slidably fitted in the openings of the frame 77 and is provided at its one end a stopper 81. A guide member 82 is secured to the shaft 80 by means such a pin 82a and a guide way provided at the top of the member 82 slidably fits with a key 83 provided on the frame 77 so that the shaft 80 is guided for horizontal movement while it is prevented from being rotated. A spring 84 is interposed between the member 82 and one end of the frame 77 so that the shaft 80 is normally urged toward the left in FIG. 16 until the stopper 81 abuts the frame 77. A cylinder 85 is secured to the member 82 and the piston rod 86 of the cylinder 85 extends in parallel to the shaft 80 beneath it. A toolholder 87 such as a welding tip holder is secured to the shaft 80 by means such as a pin 87a and slidably fits with the piston rod 86 while another toolholder 88 is secured to the piston rod 86 by means such as a pin 88a and slidably fits with the shaft 80. The arrangement of both the toolholders 87 and 88 is such that the shaft 2 assembled with the discs 1, 1a in the jig 5 which is brought in alignment with the joining device 9a is located substantially at the midpoint between the two toolholders 87, 88. Tools 89, 90 such as welding tips 10 shown in FIG. 3 are interchangeably secured to the respective toolholders 87, 88. An adjustable stopper screw 91 is adjustably screwed in a bracket 92 secured to the frame 77 so as to adjustably limit the movement of the toolholder 88.

In operation, when the respective jigs 5 are successively aligned with the joining device 9a, the cylinder 78 is actuated so that the frame 77 is lowered so as to align the vertical position of the tools 89, 90 with the shaft 2 on the jig 5 when a signal is supplied from the shaft position detecting device 8 as previously described. Subsequently, when the cylinder 85 is energized, the piston rod 86 can be advanced to make the tool 90 push against its joining area. When the resilient force of the spring 84 is overcome by the reacting force of the tool 90, the cylinder 85 is moved to the right (FIG. 16) together with the guide member 82 and the shaft 80, and hence the tool holder 87 is also moved to the right, whereby the tool 89 will be pushed against its joining area. Thus, the disc 1 and the shaft 2 can be joined together by the two tools 89 and 90 with substantially uniform pressure operating on the opposite joining areas. The force of the spring 84 may be suitably adjusted for the desired operation.

After the joining operation is completed, the cylinder 85 is actuated so as to move the toolholder 88 toward the member 82 thereby moving the two toolholders 87, 88 apart from the shaft 2 by the action of the spring 84, and the cylinder 78 is actuated so as to lift the frame 77.

The joining device 9 is similar in construction and operation to the joining device 9a described above except that the former is determined to secured the disc 1a to the shaft 2 while the latter is determined to secure the disc 1 to the shaft 2. Therefore, the detailed description of the joining device 9 is not made here.

Detaching Device

The detaching device 11 is shown in FIGS. 18–21 inclusive.

The detaching device 11 comprises a detaching head 94, a head-lifting device 95 and a head-rotating device 96.

Figure 20:
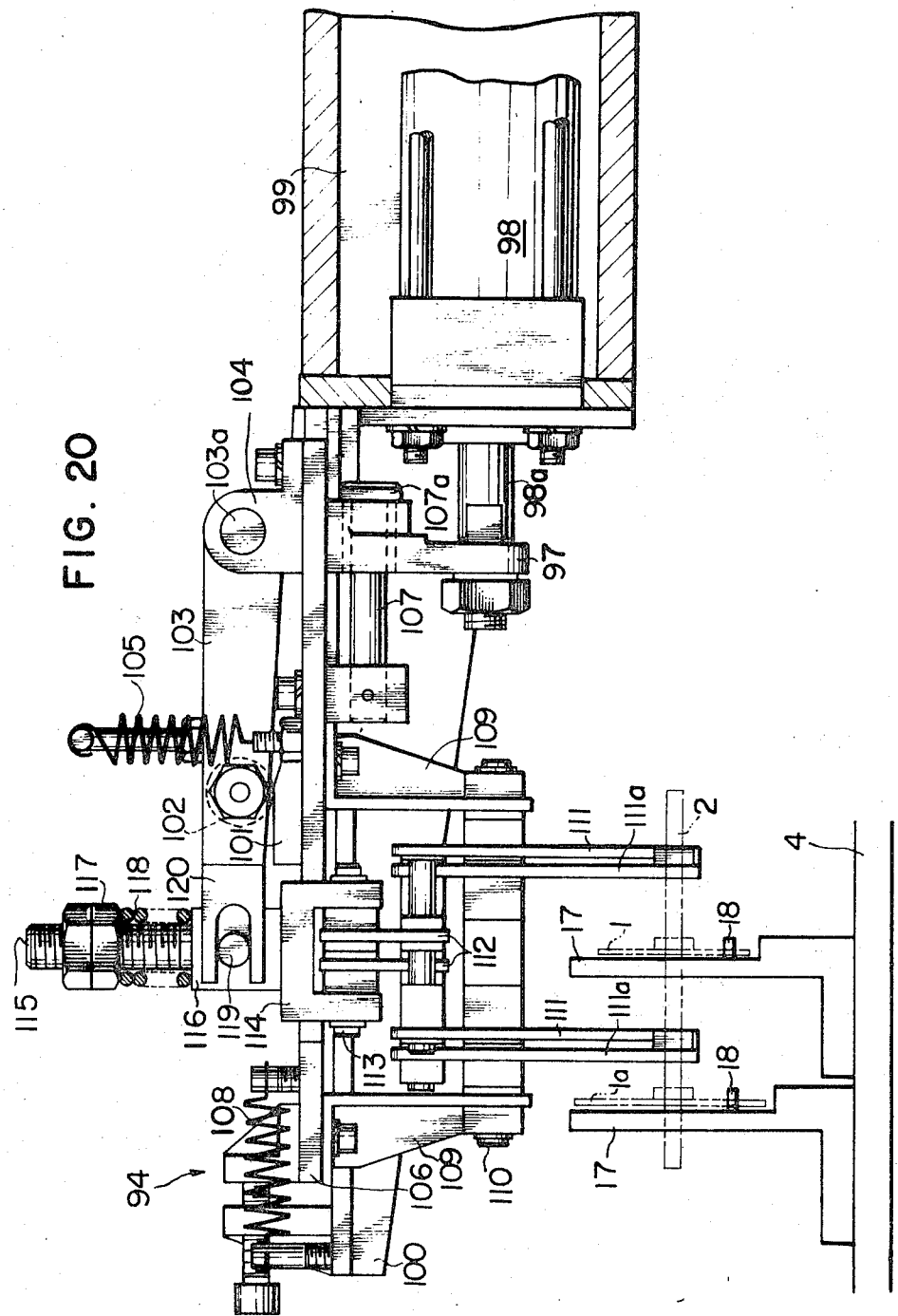
FIG. 20 is a side view of the device of FIG. 18.

The detaching head 94 comprises a shiftable block 97 connected to a piston rod 98a of a cylinder 98 which is secured to a rotatable arm 99. The block 97 is securely held by a shaft 107 which in turn is fixedly connected to a shiftable plate 106. The plate 106 is adapted to be guided by a bracket 100. After all, it is clear that the block 97 is guided by a bracket 100. The block 97 is provided with a cam 101 which cooperates with a roller 102 rotatably supported by a lever 103 pivoted about a shaft 103a journaled in a bearing 104. The cam 101 is slidable on the upper surface of the plate 106. A spring 105 is provided for urging the lever 103 anticlockwise so that the roller 102 contacts with the cam 101. A shiftable plate 106 is shiftably guided in the bracket 100 and a shaft 107 having an enlarged head 107a and secured to the shiftable plate 106 is slidably fitted in a hole in the shiftable block 97. The shiftable plate 106 is normally urged to the left as seen in FIG. 20 by means of a spring 108 one end of which is secured to the bracket 100 while the other end thereof is secured to the shiftable plate 106. Thus, when the cylinder 98 is actuated to drive the block 97 toward the right in FIG. 20, the lever 103 is swung clockwise by the engagement of the roller 102 with the cam 101 of the block 97 against the action of the spring 105, while the shiftable plate 106 is moved to the right by the engagement of the head 107a of the shaft 107 secured to the shiftable plate 106 with the block 97 against the action of the spring 108.

The shiftable plate 106 is provided with a pair of brackets 109 secured thereto which support a shaft 110. Two pairs of clamping arms 111, 111a are pivoted by the shaft 110 so as to clamp the shaft 2 when actuated. The inner ends of each of the arms 111, 111a are operatively connected to links 112, respectively, so that they can swing about the same shaft and the opposite end of each of the links 112 is pivoted on a shaft 113 which is supported by an inverted U-shaped support 114. The support 114 is provided with a shaft 115 which slidably fits in a hole of a block 116. A spring 118 is provided between collar means 117 adjustably located on a portion of the shaft 115 passing through the block 116 and projecting therefrom and the block 116 so that the support 114 is normally urged in contact with the block 116 while providing cushioning effect when the clamping arms 111, 111a clamp the shaft 2 as hereinbelow described. A pin 119 is secured to each side of the block 116 in coaxial relation to each other. The pins 119 are slidably engaged with the bifurcated portions of the bifurcation 120 formed at the outer end of the lever 103 so that the block 116 is lifted through the engagement of the pins 119 with the bifurcated portions of the bifurcation 120 of the lever 103 when the lever 103 is swung clockwise by the cam 101 contacting with the roller 102 as the cylinder 98 is actuated.

Figure 18:
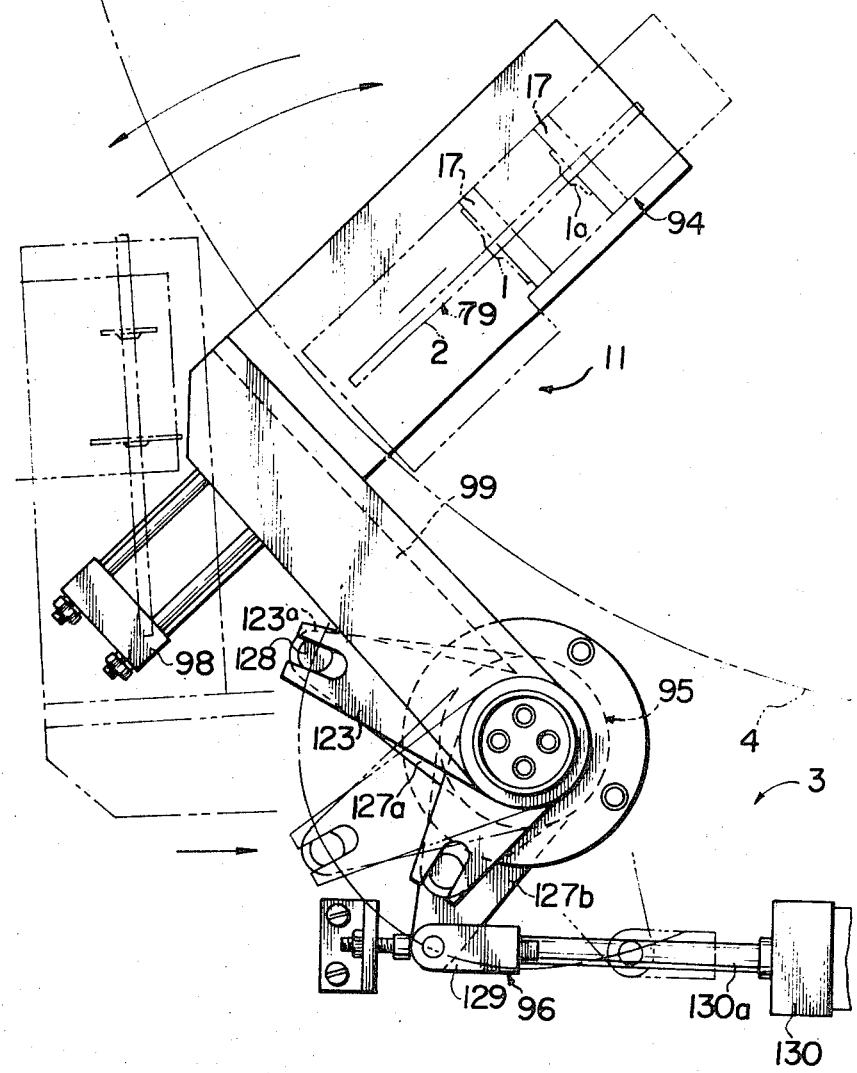
FIG. 18 is a fragmentary plan view showing an embodiment of the detaching device used in the apparatus of the present invention.
Figure 19:
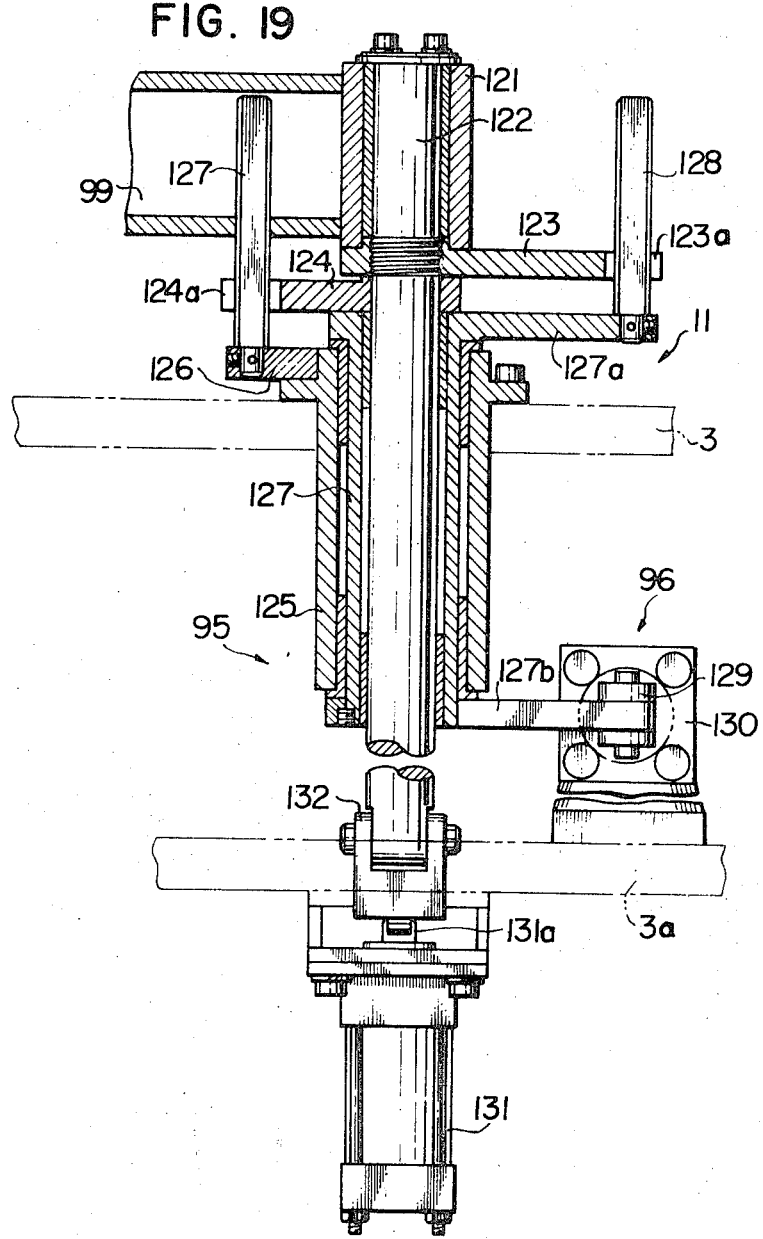
FIG. 19 is a cross-sectional view taken along the axis of the lifting rod of the device of FIG. 18.

The arm 99 is secured to a rotatable collar 121 rotatably journaled on the upper end of a vertically movable shaft 122. The collar 121 is provided with a lever 123 secured thereto which is provided a bifurcated portion 123a at the outer end thereof as shown in FIGS. 18 and 19. A lever 124 is secured to the shaft 122 immediately below the lever 123 and is provided with a bifurcated portion 124a at the outer end thereof.

A sleeve 125 is secured to the main body 3 and carries a lever 126 fixed thereto above the main body 3. An upstanding guide rod 127 is secured to the lever 126 and slidably fits with the bifurcated portion 124a of the lever 124 secured to the shaft 122 so that the lever 124 and hence the shaft 122 is prevented from being rotated while permitting the vertical displacement of the lever 124 and the shaft 122. The vertically slidable shaft 122 is journaled in the sleeve 125 through the interposition of a hollow shaft 127. The hollow shaft 127 is provided with a lever 127a integral thereto at the upper end of the shaft 127. An upstanding guide rod 128 is secured to the outer end of the lever 127a and the rod 128 is slidably fitted with the bifurcated portion 123a of the lever 123 secured to the collar 121 which carries the arm 99 so that the lever 123 together with the arm 99 is rotated by the lever 127a when the hollow shaft 127 is rotated as hereinafter described.

Another lever 127b is secured to the hollow shaft 127 at the lower end thereof. The outer end of the lever 127b is pivoted to a link 129 pivoted to a piston rod 130a of a cylinder 130 which is secured to a stationary plate 3a in the main body 3. Thus, when the cylinder 130 is actuated, the lever 127b and hence the lever 127a secured to the hollow shaft 127 is swung so that the lever 123 and hence the arm 99 are rotated.

A vertical cylinder 131 is secured to the stationary plate 3a and the piston rod 131a thereof is connected to the lower end of the shaft 122 through a joint 132. Thus, when the cylinder 131 is actuated, the shaft 122 is vertically moved while the rotation thereof is prevented by the engagement of the bifurcated portion 124a of the lever 124 secured to the shaft 122 with the guide rod 127.

The operation of the detaching device 11 is as follows.

When the jig 5 is brought into alignment with the detaching device 11, the cylinder 130 is actuated so as to bring the detaching head 94 in position above the jig 5. Then, the cylinder 131 is actuated so as to lower the detaching head 94 so that the clamping arms 111, 111a held in opened positions are brought into alignment with the shaft 2 in the jig 5. Thereafter, the cylinder 98 is actuated so as to move the member 97 toward the right in FIG. 20. This rightward movement of the member 97 first lifts the block 116 by the engagement of the roller 102 with the cam 101 which causes the clockwise rotation of the lever 103, so that the shaft 113 is moved upwardly thereby permitting the clamping arms 111, 111a to clamp the shaft 2 through the connection of the links 112. The spring 117 resiliently urging the support 114 supporting the shaft 113 against the block 116 provides the cushioning effect so that the damage of the assembly which might take place by the excessively great force caused by the forced upward movement of the block 116 is avoided. After the shaft 2 has been clamped by the clamping arms 111, 111a, the further movement of the member 97 toward the right causes the shaft 107 to be moved to the right together with the shiftable plate 106 against the action of the spring 108 by the abutment of the head 107a of the shaft 107 against the member 97 so that the brackets 109 are moved to the right together with the clamping arms 111, 111a supported by the shaft 110 secured to the brackets 109 thereby disengaging the discs 1, 1a secured to the shaft 2 from the reference pins 18 fixed to the brackets 17 of the jig 5 so as to free the assembly from the jig 5. After the assembly is disengaged from the jig 5, the cylinder 131 is actuated to lift the detaching head 94 from the jig 5 and the cylinder 130 is actuated to swing the arm 99 anticlockwise as seen in FIG. 18 so that the detaching head 94 is moved to the position shown by the chain line in FIG. 18. When the cylinder 98 is deenergized, the cam 101 is disengaged from the roller 102 of the lever 103 so that the clamping arms 111, 111a are loosened to detach the assembly thereby permitting the same to be discharged out of the apparatus through the chute 12.

As described above, by using the apparatus of the present invention, it is only necessary to supply discs 1, 1a to the respective jig 5 by the operator M each time the same is moved to the position facing to the operator M. All the operations for assembling the discs with the shaft can be automatically effected by the apparatus of the present invention.

What we claim is:

1. Apparatus for automatic assembly of a rotor and the like comprising a shaft inserted into a plurality of spaced parts such as discs and fixedly secured thereto with predetermined axial and angular relative positions held therebetween, wherein the improvement comprises a turntable intermittently rotated a predetermined angle and having a plurality of parts-mounting jigs fixed thereon at equal angular distance from each other along the peripheral zone of the turntable, the angular distance being made to correspond to the predetermined angle by which the turntable is intermittently rotated, a shaft supply device for inserting a shaft into the parts held in positions in the respective jigs to a predetermined axial position relative to the parts, a shaft position regulating device for rotating the thus-inserted shaft relative to the parts into which the shaft has been inserted so as to properly position the shaft angularly with respect to the parts, a shaft position detecting device for detecting the axial and the angular positions of the shaft with respect to the parts so as to generate a signal only when the shaft is properly positioned with respect to the parts, at least one joining device for securing the shaft to the parts, and a detaching device for removing the thus-assembled parts from the respective jigs, all said devices being arranged in that order along the periphery of said turntable at positions at which the respective jigs are stopped each time the turntable has been intermittently rotated, thereby permitting the series of the operations to be carried out in synchronism.

2. Apparatus according to claim 1, wherein a shift register is provided which receives the signal from the shaft position detecting device and also receives a signal which is generated by the predetermined angular rotation of the turntable, said shift register supplying an output signal to the joining device only when both the signals are supplied to the shift register thereby permitting the joining device to be actuated only when the parts in the jig are properly positioned to each other.

3. Apparatus according to claim 1, wherein the joining device comprises a pair of tools each mounted on shiftable shafts adapted to be moved in parallel to each other, one of the shiftable shafts being connected to a piston rod of a cylinder, while the other of the shiftable shafts is attached to the body of the cylinder.

4. Apparatus according to claim 1, wherein said jig comprises part-supporting portions each having magnet means for fixedly securing the part to be assembled to the supporting portion, part-urging portions each adapted to urge the part to said supporting portion for holding the part on said supporting portion, and a shaft-stopping means for locating the shaft inserted into the parts to be assembled therewith at a proper axial position of the shaft with respect to the parts by engaging with the groove formed in the shaft.

5. Apparatus according to claim 1, wherein said apparatus comprises a chute adapted to supply a shaft in the horizontal position of the shaft each time the turntable is operated, a transporting member located adjacent to the discharge end of the chute and laterally reciprocated so as to transport the thus-supplied shaft laterally, said member having a groove in which the shaft is engaged, and a shaft-pushing means for axially moving the shaft engaged in the groove and having been laterally transported through spring means.

6. Apparatus according to claim 1, wherein said shaft position regulating device comprises an angular position regulating pin of the shaft which snugly fits with the end of the shaft having an irregular cross-sectional configuration, a holding rod supporting said pin through resilient means allowing the relative axial movement therebetween, a shifting means for axially driving said holding rod, and a rotating means for giving a torque to said angular position regulating pin, thereby permitting the shaft to be rotated to a predetermined angular position with respect to the parts to be assembled with the shaft.

7. Apparatus according to claim 1, wherein said shaft position detecting device comprises a shaft position detecting head pin with the tip thereof snugly fitting with the end of the shaft having the irregular cross-sectional configuration, and a driving means for axially moving said head pin through resilient means, means being provided for preventing the rotation of the head pin.

8. Apparatus according to claim 1, wherein said detaching device comprises a rotatable and vertically movable arm on which an assembly clamping device is shiftably mounted so as to be shifted in a predetermined range with respect to the arm, rotating means for rotating said arm, lifting means for vertically moving upwardly and downwardly said arm, a moving mechanism being provided which is coupled with a mechanism to operate the clamping device for clamping the assembly in the first part of the stroke of said moving mechanism, while the same is coupled with another mechanism for shifting said clamping device with respect to the arm in the last part of the stroke of the moving mechanism, and driving means being provided for driving said moving mechanism.

* * * * *